US012630116B2

(12) United States Patent
Hashimoto et al.

(10) Patent No.: US 12,630,116 B2
(45) Date of Patent: May 19, 2026

(54) CONTROL DEVICE AND CONTROL SYSTEM

(71) Applicant: GLOBAL MOBILITY SERVICE INC., Tokyo (JP)

(72) Inventors: Nobuyuki Hashimoto, Tokyo (JP); Yukinori Iwata, Tokyo (JP); Koichi Hagishima, Tokyo (JP); Tokushi Nakashima, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 0 days.

(21) Appl. No.: 18/874,087

(22) PCT Filed: Jun. 7, 2023

(86) PCT No.: PCT/JP2023/021263
§ 371 (c)(1),
(2) Date: Dec. 12, 2024

(87) PCT Pub. No.: WO2023/243523
PCT Pub. Date: Dec. 21, 2023

(65) Prior Publication Data
US 2025/0263045 A1 Aug. 21, 2025

(30) Foreign Application Priority Data

Jun. 13, 2022 (JP) ................................ 2022-095296
Jan. 28, 2023 (JP) ................................ 2023-011428

(51) Int. Cl.
*B60R 25/24* (2013.01)
*B60R 25/04* (2013.01)
*B60R 25/102* (2013.01)

(52) U.S. Cl.
CPC .............. *B60R 25/24* (2013.01); *B60R 25/04* (2013.01); *B60R 25/102* (2013.01)

(58) Field of Classification Search
CPC ........ B60R 25/24; B60R 25/04; B60R 25/102
See application file for complete search history.

(56) References Cited

U.S. PATENT DOCUMENTS

| | | | | |
|---|---|---|---|---|
| 5,726,885 A | * | 3/1998 | Klein | ..................... G08G 1/127 |
| | | | | 705/5 |
| 5,796,179 A | | 8/1998 | Honaga | |
| 9,867,008 B2 | * | 1/2018 | Nishidai | ............... H04W 84/18 |
| 10,220,814 B2 | * | 3/2019 | Mitsubayashi | ....... B60R 16/037 |
| 10,403,071 B2 | * | 9/2019 | Endo | ........................ G07C 9/28 |

(Continued)

FOREIGN PATENT DOCUMENTS

| | | |
|---|---|---|
| JP | H09-095212 A | 4/1997 |
| JP | 2003-146185 A | 5/2003 |

(Continued)

*Primary Examiner* — Thomas D Alunkal
(74) *Attorney, Agent, or Firm* — HAUPTMAN HAM, LLP

(57) ABSTRACT

A control device includes a controller capable of setting activation of a drive device of a vehicle to be either enabled or disabled, the drive device being able to be activated by performing an activation operation in a case where a predetermined condition is satisfied, wherein in a case where activation of the drive device is set to be disabled, the controller prevents activation of the drive device even if the activation operation has been performed in a case where the predetermined condition is satisfied.

9 Claims, 9 Drawing Sheets

(56)        References Cited

U.S. PATENT DOCUMENTS

| | | | | |
|---|---|---|---|---|
| 10,475,268 | B2 * | 11/2019 | Saiki | H04Q 9/00 |
| 11,691,595 | B2 * | 7/2023 | Nagai | H04M 11/00 |
| | | | | 340/5.61 |
| 2003/0135321 | A1 * | 7/2003 | Kumazaki | F02N 11/0803 |
| | | | | 307/10.6 |
| 2005/0179320 | A1 * | 8/2005 | Shimomura | B60R 25/2018 |
| | | | | 340/5.85 |
| 2007/0222563 | A1 * | 9/2007 | Shimomura | B60R 25/2018 |
| | | | | 340/426.22 |
| 2007/0247281 | A1 * | 10/2007 | Shimomura | B60R 25/403 |
| | | | | 340/426.11 |
| 2015/0298630 | A1 | 10/2015 | Iwai | |
| 2015/0363983 | A1 * | 12/2015 | Cunnings | G01M 17/007 |
| | | | | 701/29.1 |
| 2016/0098870 | A1 * | 4/2016 | Bergerhoff | H04W 4/48 |
| | | | | 340/5.61 |
| 2018/0095456 | A1 * | 4/2018 | Obaidi | G07C 9/00174 |
| 2018/0099643 | A1 * | 4/2018 | Golsch | G01S 13/765 |
| 2020/0114872 | A1 * | 4/2020 | Hiroki | B60R 25/305 |
| 2021/0237682 | A1 * | 8/2021 | Sakurada | B60R 25/40 |
| 2022/0266797 | A1 * | 8/2022 | Katoh | B60R 25/24 |

FOREIGN PATENT DOCUMENTS

| | | | |
|---|---|---|---|
| JP | 2005-076467 | A | 3/2005 |
| JP | 2007-022147 | A | 2/2007 |
| JP | 2007-276595 | A | 10/2007 |
| JP | 2012-019473 | A | 1/2012 |
| JP | 2013-203294 | A | 10/2013 |
| JP | 2014-046722 | A | 3/2014 |
| JP | 2021-187426 | A | 12/2021 |

* cited by examiner

FIG. 1

FIG. 3A
FIG. 3B
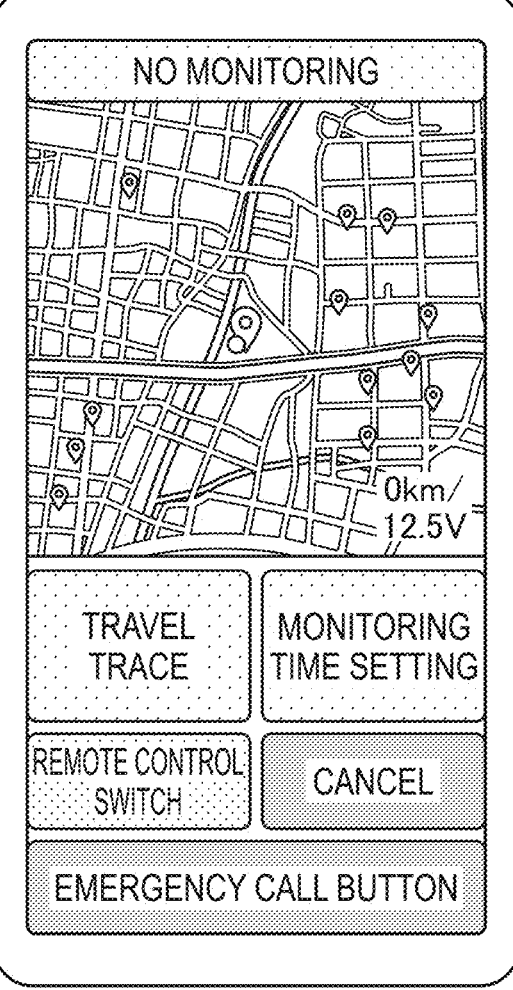
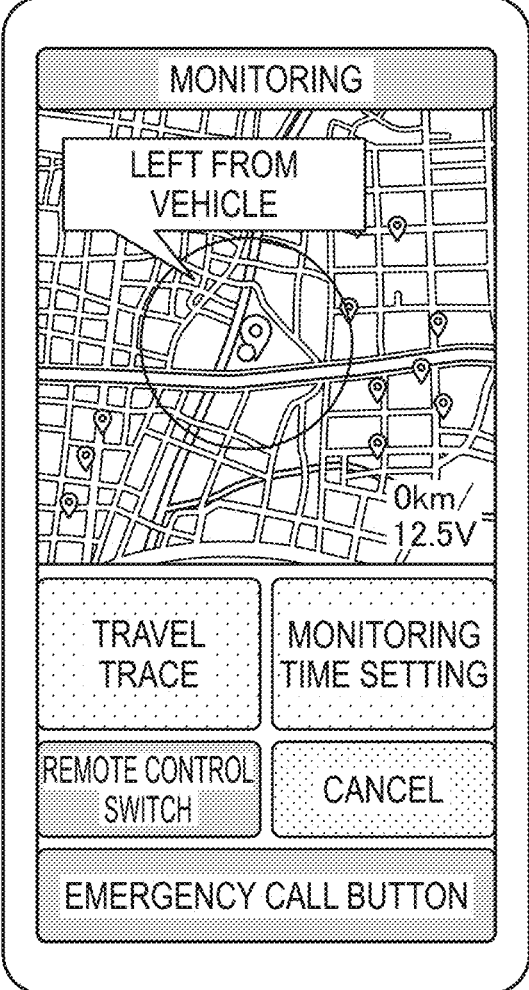

FIG. 5

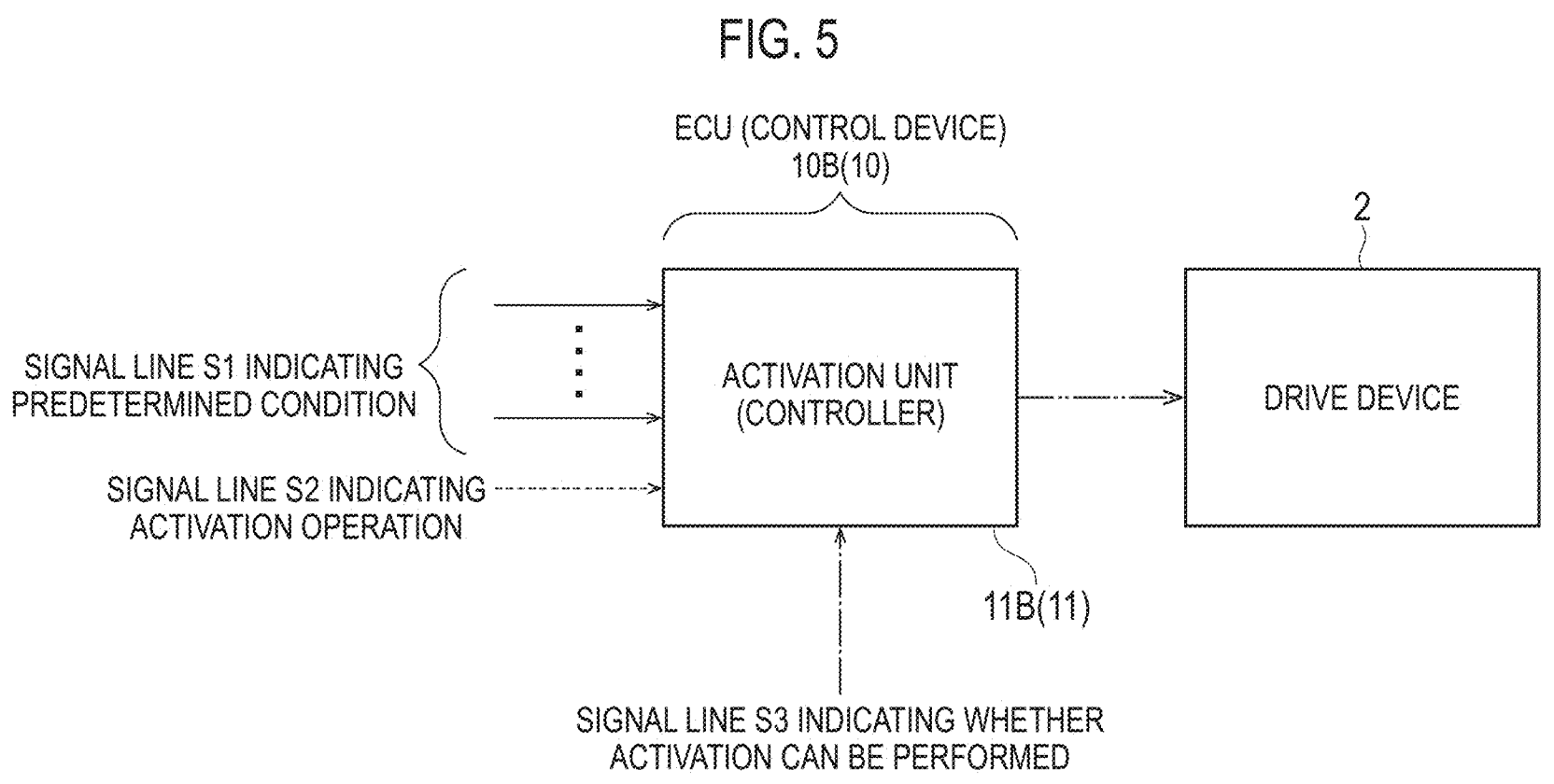

ECU (CONTROL DEVICE)
10B(10)

ACTIVATION UNIT
(CONTROLLER)

11B(11)

DRIVE DEVICE

2

SIGNAL LINE S1 INDICATING
PREDETERMINED CONDITION

SIGNAL LINE S2 INDICATING
ACTIVATION OPERATION

SIGNAL LINE S3 INDICATING WHETHER
ACTIVATION CAN BE PERFORMED

FIG. 8

```
                    ┌──────────┐
                    │  START   │
                    └────┬─────┘
                         │
                         ▼                    S301
              ╱─────────────────────╲
             ╱                       ╲            NO
            ╱    IS PAYMENT MADE?     ╲──────────────┐
            ╲                         ╱              │
             ╲                       ╱               │
              ╲─────────────────────╱                │
                         │ YES          S302         │
                         ▼                           │
            ┌─────────────────────────────────┐      │
            │   RECEIVE SIGNAL FROM SERVER     │      │
            └────────────────┬────────────────┘      │
                             │            S303        │
                             ▼                        │
            ┌─────────────────────────────────┐      │
            │ DISPLAY "DISABLED SETTING IS     │      │
            │         CANCELED"                │      │
            └────────────────┬────────────────┘      │
                             │◄──────────────────────┘
                             ▼
                        ┌──────────┐
                        │   END    │
                        └──────────┘
```

CONTROL DEVICE AND CONTROL SYSTEM

RELATED APPLICATIONS

The present application is a National Phase of International Application No. PCT/JP2023/021263 filed Jun. 7, 2023, which claims priority to Japanese Application Nos. 2022-095296, filed Jun. 13, 2022, and 2023-011428, filed Jan. 28, 2023.

TECHNICAL FIELD

The present invention relates to a control device and a control system.

BACKGROUND ART

Conventionally, there is known a function (immobilizer) in which an engine is not started unless an ID set on a vehicle side matches an ID set on a key side (see, for example, Patent Literature 1).

CITATION LIST

Patent Literature

Patent Literature 1: JP 09-095212 A

SUMMARY OF INVENTION

However, in a vehicle having the above-described functions, if the ID on the vehicle side is rewritten with a device called an immobile cutter, there is a problem that the engine can be started by registering the rewritten ID in an unauthorized key.

Therefore, the present invention has been made in view of the above-described problems, and an object of the present invention is to provide a control device and a control system capable of preventing theft of a vehicle without increasing cost.

Solution to Problem

A control device according to an embodiment is summarizes as a control device which is mounted on a vehicle, the control device including: a controller capable of setting activation of a drive device of the vehicle to be either enabled or disabled, the drive device being able to be activated by performing an activation operation in a case where a predetermined condition is satisfied, wherein in a case where activation of the drive device is set to be disabled, the controller prevents activation of the drive device even if the activation operation has been performed in a case where the predetermined condition is satisfied.

A control system according to an embodiment is summarizes as including: a control device and a communication terminal mounted on a vehicle, wherein the drive device of the vehicle is able to be activated by performing an activation operation in a case where a predetermined condition is satisfied, the control device includes a controller capable of setting activation of the drive device to be either enabled or disabled, and the communication terminal displays whether to activate the drive device according to a signal from the control device.

A control method according to an embodiment is summarizes as including of: (A) activating a drive device of a vehicle by performing an activation operation in a case where a predetermined condition is satisfied; (B) setting, by a control device mounted in the vehicle, activation of the drive device to be either enabled or disabled; and (C) displaying, by a communication terminal, whether to activate the drive device according to a signal from the control device.

Advantageous Effects of Invention

According to the present invention, it is possible to provide a control device and a control system capable of preventing theft of a vehicle without increasing cost.

BRIEF DESCRIPTION OF DRAWINGS

FIG. 1 is a diagram illustrating an example of an overall configuration of a control system 100 according to a first embodiment.

FIG. 3A and FIG. 3B are diagrams illustrating an example of display by an application installed in the communication terminal 20 according to the first embodiment.

FIG. 5 is a diagram illustrating an example of an internal configuration of a vehicle 1 on which a control device 10 according to a second embodiment is mounted.

FIG. 8 is a flowchart for explaining an operation in which an application displays a pop-up.

DESCRIPTION OF EMBODIMENTS

Figure 2:
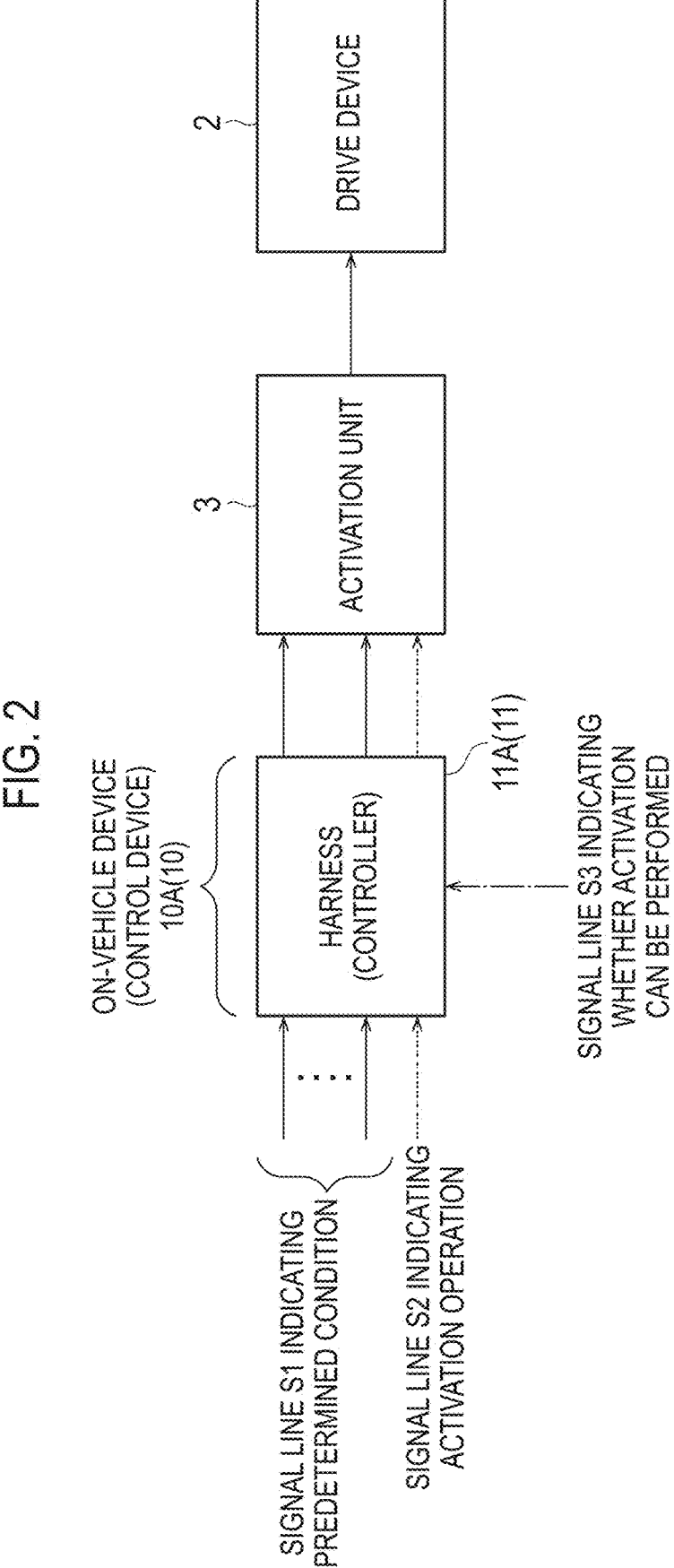
FIG. 2 is a diagram illustrating an example of an internal configuration of a vehicle 1 on which a control device 10 according to the first embodiment is mounted.

Hereinafter, preferred embodiments of the present invention will be described in detail with reference to the accompanying drawings. In the following description of the drawings, the same or similar parts are denoted by the same or similar reference numerals. However, it should be noted that the drawings are schematic, and ratios of dimensions and the like are different from actual ones. Therefore, specific dimensions and the like should be determined in consideration of the following description. In addition, the drawings may include portions having different dimensional relationships and ratios. In the present specification and the drawings, elements having substantially the same function and configuration are denoted by the same reference numerals, and redundant description is omitted, and elements not directly related to the present invention are not illustrated.

First Embodiment

Figure 1:
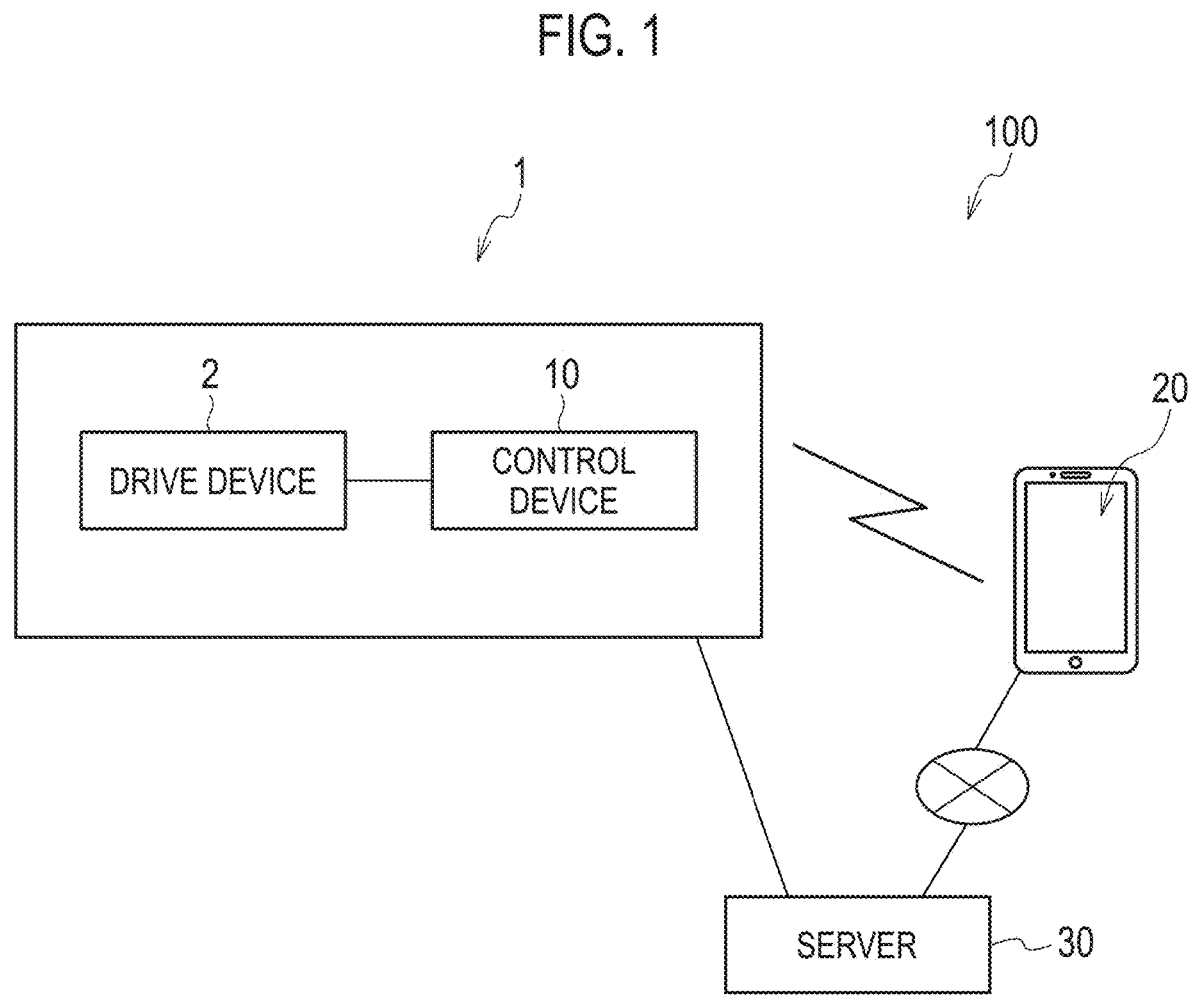

Hereinafter, a control system 100 according to a first embodiment of the present invention will be described with reference to FIGS. 1 to 4. The control system 100 according to the present embodiment is configured for the purpose of preventing theft of a vehicle 1.

Figure 4:
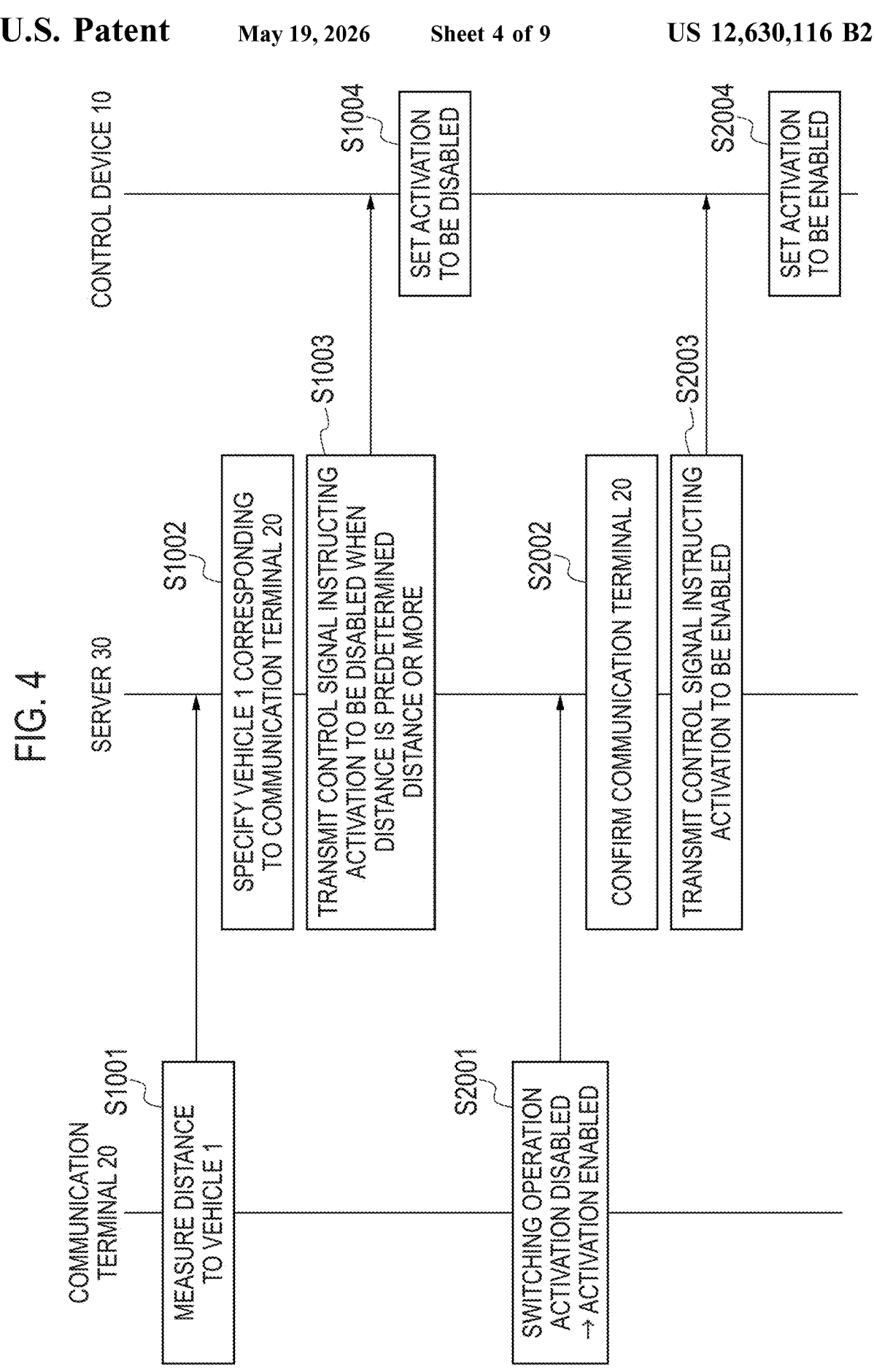
FIG. 4 is a sequence diagram illustrating an example of operation of the control system 100 according to the first embodiment.

FIG. 1 is a diagram illustrating an example of an overall configuration of the control system 100 according to an embodiment, FIG. 2 is a diagram illustrating an example of an internal configuration of the vehicle 1 on which a control device 10 according to an embodiment is mounted, FIG. 3A and FIG. 3B are diagrams illustrating an example of display by an application installed in a communication terminal 20 according to an embodiment, and FIG. 4 is a sequence diagram illustrating an example of an operation of the control system 100 according to the first embodiment.

As illustrated in FIG. 1, the control system 100 according to the present embodiment includes the control device 10 mounted on the vehicle 1, the communication terminal 20, and a server 30.

In the present embodiment, the vehicle 1 may be a vehicle having an engine (internal combustion engine), or may be any type of vehicle such as an electric vehicle (EV), a hybrid electric vehicle (HEV), a plug-in hybrid vehicle (PHV), or a fuel cell vehicle (FCV).

The vehicle 1 is not particularly limited as long as it is a vehicle (examples thereof include construction equipment and agricultural equipment) that can be driven by wheels, a caterpillar, or the like, and may be, for example, a two-wheeled vehicle, a three-wheeled vehicle, or a six-wheeled vehicle in addition to a normal four-wheeled vehicle.

In addition, the vehicle 1 may include a vehicle capable of unmanned travel (Level 4: fully self-driving under specific conditions, level 5: fully self-driving) by remote control.

As the communication terminal 20, a portable communication terminal such as a smartphone is assumed. Although not specifically illustrated, the configuration of the communication terminal 20 includes, for example, a CPU that executes an application downloaded from the server 30 and controls the execution of communication via near field communication, WiFi, mobile phone line communication, or the like, a screen on which the execution content of the application is displayed, a GPS that detects position information, an input unit that receives user input, a speaker that outputs sound, and the like.

As illustrated in FIG. 1, a drive device 2 and a control device 10 are mounted on the vehicle 1. In addition, electric devices such as a headlight, a car stereo, and an air conditioner, electronic devices such as various electronic controllers (ECUs) and telematics controllers (TCUs), various harnesses, and the like are mounted on the vehicle 1.

The drive device 2 is configured to be activated by performing an activation operation when a predetermined condition is satisfied.

Here, the drive device 2 may be the engine described above, or may be a motor in the case of EV, HEV, PHV, FCV, or the like.

For example, as the predetermined condition, it is assumed that a shift lever is in a parking range, a brake is stepped on, and the like. In addition, the predetermined condition may include that an encryption key included in an on-vehicle device 10A to be described later matches an encryption key in an application to be described later, that the communication terminal 20 is in the vehicle 1, that a distance between the vehicle 1 and the communication terminal 20 is within a certain range, and the like.

Furthermore, as the activation operation, an operation of inserting a key by the driver and rotating, an operation of pressing a start switch, an operation of pressing a button of an application (digital key) installed in a smartphone as the communication terminal 20, and the like are assumed.

The control device 10 includes a controller 11 that can set activation of the drive device 2 to be either enabled or disabled.

Here, the control device 10 may be the on-vehicle device 10A mounted on the vehicle 1 as illustrated in FIG. 2, or may be built in an ECU 10B as illustrated in FIG. 5 for explaining a second embodiment to be described later.

The present embodiment is a case where the control device 10 is the on-vehicle device 10A mounted on the vehicle 1.

The on-vehicle device 10A is an electronic device installed in the vehicle 1, and has a communication function for communicating with the server 30, the communication terminal 20, and the like via a radio network.

For example, one on-vehicle device 10A is installed in one vehicle 1. The on-vehicle device 10A may be installed in any place of the vehicle 1 as long as the on-vehicle device 10A can control the vehicle 1.

In a case where the on-vehicle device 10A is attached later, the on-vehicle device can be disposed in a place where installation work is easy, such as the inside of the instrument panel. Further, from the viewpoint of theft prevention, the on-vehicle device 10A may be disposed in a place where it is difficult to remove the on-vehicle device, for example, a lower portion of an engine room. Further, the on-vehicle device 10A can be built in advance at the time of manufacturing the vehicle 1.

The on-vehicle device 10A is configured to be able to collect vehicle information of the installed vehicle 1.

Here, the vehicle information desirably includes the position of the shift lever, detection information indicating whether the brake is stepped on, position information of the vehicle by the GPS, and the like.

The on-vehicle device 10A may be configured to be able to transmit the collected vehicle information to the server 30 via the radio network and receive a control signal from the server 30 via the radio network.

The on-vehicle device 10A is configured to be able to control the vehicle 1 based on such a control signal and the like. For example, the on-vehicle device 10A has a control function of performing activation control or the like of the drive device 2 (engine, motor, or the like) on the basis of the control signal or the like.

As illustrated in FIG. 2, the on-vehicle device 10A includes harness 11A as the controller 11 that can set whether the activation of the drive device 2 is either enabled or disabled.

As illustrated in FIG. 2, a signal line S1 indicating a predetermined condition, a signal line S2 indicating an activation operation, and a signal line S3 indicating whether activation can be performed are connected to the harness 11A.

Here, the harness 11A receives a signal indicating whether a predetermined condition is satisfied via the signal line S1.

In addition, the harness 11A receives a signal indicating that the activation operation has been performed via the signal line S2.

Furthermore, the harness 11A can be set to either enable or disable the activation of the drive device 2 according to the signal received via the signal line S3. Here, the signal line S3 is connected to the above-described communication function. In addition, the signal received via the signal line S3 is a signal for remote control transmitted by the communication terminal 20 or the server 30.

In a case where the activation of the drive device 2 is set to be disabled, the harness 11A is configured to prevent the activation of the drive device 2 even if the activation operation has been performed in a case where a predetermined condition is satisfied.

That is, even when receiving the signal indicating that the predetermined condition is satisfied via the signal line S1 and receiving the signal indicating that the activation operation has been performed via the signal line S2, the harness 11A is configured to prevent transmission of at least one of the signal indicating that the predetermined condition is satisfied and the signal indicating that the activation operation has been performed to an activation unit 3 in a case where the activation of the drive device 2 is set to be disabled. For example, prevention of such transmission may be realized by a relay or the like. Here, the relay may be a mechanical relay or an electronic relay. As a result, the activation unit 3 cannot start the drive device 2.

On the other hand, when receiving the signal indicating that the predetermined condition is satisfied via the signal line S1 and receiving the signal indicating that the activation operation has been performed via the signal line S2, the harness 11A is configured to transmit the signal indicating that the predetermined condition is satisfied and the signal indicating that the activation operation has been performed to the activation unit 3 in a case where the activation of the drive device 2 is set to be enable. In such a case, the activation unit 3 is configured to activate the drive device 2 based on a signal indicating that the predetermined condition is satisfied and a signal indicating that the activation operation has been performed.

When receiving the signal indicating that the predetermined condition is not satisfied via the signal line S1 and receiving the signal indicating that the activation operation has been performed via the signal line S2, the harness 11A is configured to transmit the signal indicating that the predetermined condition is not satisfied and the signal indicating that the activation operation has been performed to the activation unit 3 in a case where the activation of the drive device 2 is set to enable. In such a case, even if the activation unit 3 receives a signal indicating that the activation operation has been performed in response to a signal indicating that the predetermined condition is not satisfied, the activation unit 3 cannot activate the drive device 2.

As illustrated in FIG. 3A and FIG. 3B, the communication terminal 20 is configured to be able to display installed applications.

For example, the communication terminal 20 is configured to perform a display as illustrated in FIG. 3A in a case where such an application is not monitoring the vehicle 1, and perform a display as illustrated in FIG. 3B in a case where such an application is monitoring the vehicle 1.

That is, the application is configured to cause the communication terminal 20 to perform display as illustrated in FIG. 3A in a case where the activation of the drive device 2 is enabled, and cause the communication terminal 20 to perform a display as illustrated in FIG. 3B in a case where the activation of the drive device 2 is disabled.

When the user of the communication terminal 20 presses the "Remote control switch" while the display of FIG. 3A is being performed, the application transmits a control signal to the control device 10 via the communication terminal 20, and the controller 11 of the control device 10 sets that the activation of the drive device 2 is disabled according to the control signal received via the signal line S3.

That is, the controller 11 may be configured to switch the setting of whether to activate the drive device 2 according to a control signal from the communication terminal 20.

Furthermore, by the operation of pressing the "Remote control switch" by the user, the application may recognize the pressing operation by the user, and may blink the "Remote control switch" or perform a pop-up display of "Activation is being set to be disabled", for example. As a result, the user can confirm that "Activation disabled" has been set by his/her operation.

Furthermore, the controller 11 may automatically set the activation of the drive device 2 to be disabled when the communication terminal 20 is away from the vehicle 1 by a predetermined distance or more.

Furthermore, the controller 11 may set the timing at which the activation of the drive device 2 is switched to be disabled to a certain elapsed time.

For example, the controller 11 may automatically switch the activation of the drive device 2 to be disabled after a certain elapsed time has passed since the communication terminal 20 left the vehicle, may automatically switch the activation of the drive device 2 to be disabled after a certain elapsed time has passed since the key lock, may automatically switch the activation of the drive device 2 to be disabled after a certain elapsed time has passed since the engine has been turned off, or may automatically switch the activation of the drive device 2 to be disabled after a certain elapsed time has passed since the user has removed the seat.

Furthermore, the controller 11 may be configured not to automatically switch the activation of the drive device 2 to be disabled even when the communication terminal 20 is away from the vehicle by a predetermined distance or more in a state where the drive device 2 is on. As a result, in a case where the driver temporarily leaves the vehicle, it is possible to prevent the activation of the drive device 2 from being disabled.

Furthermore, the controller 11 may set to automatically switch the activation of the drive device 2 to be enabled when the communication terminal 20 approaches the vehicle 1 at a distance within a predetermined distance in a state where the activation of the drive device 2 is set to be disabled.

In addition, in a case where payment of a car loan or a lease related to the vehicle 1 is delayed, the server 30 may transmit the above-described control signal to the on-vehicle device 10A to prevent driving of the drive device 2, and when the payment is confirmed, the drive device 2 may be enabled to be driven by the above-described control signal.

Furthermore, the controller 11 may be configured to give priority to the control signal transmitted by the server 30 when the control signal transmitted by the communication terminal 20 on the basis of the operation of the user and the control signal transmitted by the server 30 conflict with each other.

For example, the application may be configured to ignore an operation (that is, an operation of pressing "Cancel") for setting that the activation of the drive device 2 is enabled by the user in a state in which the controller 11 sets the activation of the drive device 2 to be disabled (that is, FIG. 3B) on the basis of the control signal transmitted by the server 30 because the payment of the car loan or the lease related to the vehicle is delayed. In such a case, the application may be configured to perform a pop-up display of "Activation is being set to be disabled" indicating that the activation of the drive device 2 is set to be disabled by the server 30.

In addition, the application may be configured such that the user cannot press "Cancel" in a state (that is, FIG. 3B) in which activation of the drive device 2 is set to be disabled.

When the change of the setting is completed, the control device 10 transmits a signal indicating the completion to the communication terminal 20. The communication terminal 20 switches the display from the display of FIG. 3A to the display of FIG. 3B according to the signal.

Note that the application may be configured to start monitoring the vehicle 1 at such timing.

On the other hand, when the user of the communication terminal 20 presses "Cancel" while the display of FIG. 3B is being performed, the application transmits a signal to the control device 10 via the communication terminal 20, and the controller 11 of the control device 10 sets the activation of the drive device 2 to be enabled according to the signal received via the signal line S3.

That is, the controller 11 may be configured to switch the setting of whether to activate the drive device 2 according to a control signal from the communication terminal 20.

When the change of the setting is completed, the control device 10 transmits a signal indicating the completion to the communication terminal 20. The communication terminal 20 switches the display from the display of FIG. 3B to the display of FIG. 3A according to the signal.

Note that the application may be configured to end monitoring the vehicle 1 at such timing.

That is, the communication terminal 20 is configured to display whether to activate the drive device 2 according to a signal from the control device 10.

In the example of FIG. 3A and FIG. 3B, the communication terminal 20 is configured to display whether to activate the drive device 2 according to the display methods (for example, color and the like) of "Remote control switch" and "Cancel".

Furthermore, the communication terminal 20 may be configured to display whether to activate the drive device 2 by an alarm or vibration.

Note that, in a case where there is a change in the setting as to whether to activate the drive device 2 on the control device 10 side, the control device 10 transmits a signal indicating such a change to the communication terminal 20, and the communication terminal 20 is configured to display whether to activate the drive device 2 according to the signal from the control device 10.

According to the above configuration, the user can confirm whether the drive device 2 can be activated by viewing the display of the communication terminal 20. As a result, in a case where the user is away from the vehicle 1, the user can easily confirm that the user has forgotten to monitor the vehicle 1.

Furthermore, according to the above-described configuration, the user can easily switch the setting of whether to activate the drive device 2 the using communication terminal 20.

Furthermore, the controller 11 may be configured to set the activation of the drive device 2 to be disabled in a case where it is detected that the communication terminal 20 is outside a predetermined area.

For example, the application may be configured to monitor the distance between the vehicle 1 (the control device 10) and the communication terminal 20 in a state of monitoring the vehicle 1 (the state of FIG. 3B), and when detecting that the communication terminal 20 is present outside the predetermined area, notify the control device 10 of the fact via the communication terminal 20.

Here, for example, as the predetermined area, a parking lot of a home, a specifically registered place, a place visited several times or more, or the like is assumed.

For example, such an application may detect that the communication terminal 20 is present outside the predetermined area in a case where the communication terminal 20 is out of the communicable range in the near field communication between the vehicle 1 and the communication terminal 20 or in a case where the distance between the position information by the GPS of the vehicle 1 and the position information by the GPS of the communication terminal 20 is a predetermined distance or more.

According to such a configuration, even in a case where the user forgets to set the activation of the drive device 2 to be disabled when leaving the vehicle 1, the activation of the drive device 2 can be automatically set to be disabled, which is more effective in preventing theft of the vehicle 1.

Note that the application may be configured to constantly monitor the distance between the vehicle 1 (the control device 10) and the communication terminal 20, and may be configured to automatically set the activation of the drive device 2 to be disabled as described above.

Furthermore, in a case where the controller 11 detects vibration, the controller may be configured to notify the communication terminal 20 of the detection.

In such a case, in a case where such a notification is received in a state where the vehicle 1 is monitored (the state of FIG. 3B), the application may be configured to notify the user of the fact by a predetermined method (alarm notification, blinking display, pop-up display, or the like on the communication terminal 20).

According to such a configuration, the user can immediately detect that the window has been broken, that the vehicle is about to be stolen by a loading vehicle such as a tow truck, that the control device 10 mounted on the vehicle 1 is about to be removed, and the like, and can easily contact a security company or the like by pressing the "Emergency call button".

Note that the controller 11 may be configured to detect a change in voltage or the like that can be detected by the control device 10, and in a case where the voltage exceeds a predetermined range, notify the communication terminal 20 of the fact.

Furthermore, in a case where an abnormality is detected in an image captured by a security camera, the controller 11 may be configured to notify the communication terminal 20 of the detection.

Furthermore, in a case where the drive device 2 is activated or the doors of the vehicle 1 are unlocked after receiving the monitoring signal from the communication terminal 20 (that is, after the application transitions to the state of monitoring the vehicle 1), the controller 11 may be configured to notify the communication terminal 20 of the fact.

In such a case, in a case where such a notification is received, the application may be configured to notify the user of the fact by a predetermined method (alarm notification, blinking display, pop-up display, or the like on the communication terminal 20).

Furthermore, in a case where the above-described detection has been performed, the controller 11 may be configured to notify the user of the fact by generating a warning sound in the vehicle 1 or turning on the lamp of the vehicle 1.

According to such a configuration, the user can immediately detect that the vehicle 1 is about to be stolen, and can easily contact the security company or the like by pressing the "Emergency call button".

Alternatively, in a case where the control device 10 detects that the vehicle 1 is about to be stolen, the user may be notified of the fact via the communication terminal 20, and a contact may be automatically transmitted to at least one of the security company and the vehicle collection company via the server 30.

In such a case, the control device 10 may be configured to notify at least one of the security company and the vehicle collection company of at least one of the position information of the vehicle 1, the time information, and the type (vehicle type) of the vehicle 1 together via the server 30.

In addition, when the user is notified that the vehicle 1 is about to be stolen, the server 30 may instruct the control device 10 to return to the activation-disabled state again. Alternatively, the user who has received the notification may instruct the control device 10 to return to the activation-disabled state again through the operation of the application of the communication terminal 20.

The user can press "Monitoring time setting" to start or end monitoring of the vehicle 1 at a predetermined time every day. Alternatively, the application may be configured to start monitoring the vehicle 1 after a set time from the stop of the drive device 2.

The application may be configured to instruct the control device 10 to disable the activation of the drive device 2 in a case where the drive device 2 is activated and stolen in some way in a state of monitoring the vehicle 1 and then the drive device 2 is stopped.

Hereinafter, an example of the operation of the control system according to the present embodiment will be described with reference to FIG. 4.

As illustrated in FIG. 4, in step S1001, the communication terminal 20 measures the distance to the vehicle 1 and transmits the measurement result to the server 30.

In step S1002, the server 30 specifies the vehicle 1 corresponding to the communication terminal 20.

In step S1003, in a case where the distance between the communication terminal 20 and the vehicle 1 is a predetermined distance or more, the server 30 transmits a control signal for instructing the control device 10 to be disabled.

The control device 10 sets the activation of the drive device 2 to be disabled according to the control signal.

As illustrated in FIG. 4, in step S2001, when the user of the communication terminal 20 performs an operation for switching the activation of the drive device 2 from disabled to enabled, the communication terminal 10 transmits a signal indicating the fact to the server 30.

In step S2002, the server 30 confirms the validity of the communication terminal 20. Here, the server 30 may confirm the validity of the communication terminal 20 by key authentication of the communication terminal 20.

In step S2003, when the validity is confirmed, the server 30 transmits a control signal instructing activation to the control device 10.

The control device 10 sets the activation of the drive device 2 to be enabled according to the control signal.

According to the control system 100 and the control device 10 of the present embodiment, it is possible to prevent theft of the vehicle 1 without increasing cost.

Second Embodiment

Hereinafter, a second embodiment of the present invention will be described with reference to FIG. 5 focusing on differences from the above-described first embodiment.

The present embodiment is a case where the control device 10 is built in the ECU 10B.

The ECU 10B is configured to be able to communicate with a predetermined server or the like via a TCU or the like. The ECU 10B is configured to be able to collect the above-described vehicle information of the vehicle 1. Here, the TCU may be configured to be able to directly communicate with the communication terminal 20 by near field communication.

The ECU 10B may be configured to be able to transmit the collected vehicle information to a predetermined server via a radio network and receive a control signal from the predetermined server via the radio network.

Furthermore, the ECU 10B may be configured to be able to directly transmit the collected vehicle information to the communication terminal 20 by near field communication and receive a control signal from the communication terminal 20 via near field communication.

The ECU 10B is configured to be able to control the vehicle 1 on the basis of such a control signal and the like. For example, the ECU 10B has a control function of performing activation control or the like of the drive device 2 (engine, motor, or the like) on the basis of the control signal or the like.

As illustrated in FIG. 5, the ECU 10B includes an activation unit 11B as the controller 11 that can set the activation of the drive device 2 to be either enabled or disabled.

As illustrated in FIG. 5, a signal line S1 indicating a predetermined condition, a signal line S2 indicating an activation operation, and a signal line S3 indicating whether activation can be performed are connected to the activation unit 11B.

Here, the activation unit 11B receives a signal indicating whether a predetermined condition is satisfied via the signal line S1.

In addition, the activation unit 11B receives a signal indicating that the activation operation has been performed via the signal line S2.

Furthermore, the activation unit 11B can be set to either enable or disable the activation of the drive device 2 according to the signal received via the signal line S3.

In a case where the activation of the drive device 2 is set to be disabled, the activation unit 11B is configured to prevent the activation of the drive device 2 even if the activation operation has been performed in a case where a predetermined condition is satisfied.

That is, even when receiving the signal indicating that the predetermined condition is satisfied via the signal line S1 and receiving the signal indicating that the activation operation has been performed via the signal line S2, the activation unit 11B is configured to be disabled to activate the drive device 2 in a case where the activation of the drive device 2 is set to be disabled.

On the other hand, when receiving the signal indicating that the predetermined condition is satisfied via the signal line S1 and receiving the signal indicating that the activation operation has been performed via the signal line S2, the activation unit 11B is configured to activate the drive device 2 in a case where the activation of the drive device 2 is set to be enable.

Further, when receiving the signal indicating that the predetermined condition is not satisfied via the signal line S1 and receiving the signal indicating that the activation operation has been performed via the signal line S2, the activation unit 11B is configured to be unable to activate the drive device 2 in a case where the activation of the drive device 2 is set to be enable.

Here, according to the case where matching between the encryption key included in the on-vehicle device 10A and the encryption key in the above-described application is input to the signal line S1 and the operation of pressing the button of the above-described application is input to the signal line S2, even in a case where the encryption key is intentionally changed for the purpose of theft, the activation of the drive device 2 can be prevented by the controller 11.

Modification 1

Hereinafter, Modification 1 of the present invention will be described focusing on differences from the first embodiment and the second embodiment described above.

In Modification 1, in a case where such payment has not been made even though the payment due date of the car loan or the lease related to the vehicle has come, in response to an instruction from the server 30, the application may be configured to perform a pop-up display of "Not paid. Please complete paying procedure".

In a case where the user has made payment for a car loan or a lease related to the vehicle (for example, in a case where online payment is made using the communication terminal 20), the application enables an operation (that is, an operation of pressing "Cancel") for setting the activation of the drive device 2 by the user to be enabled in response to an instruction from the server 30. In such a case, the application may be configured to perform a pop-up display of "Disabled setting is canceled" indicating that the payment procedure (paying procedure) of the car loan or the lease related to the vehicle is completed.

Here, the application may be configured to display a contact address (a telephone number, an e-mail address, or the like) of the management center together in the pop-up display described above. The controller 11 may be configured to set the activation of the drive device 2 from the server 30 to be enabled by the user contacting the management center (making a phone call, sending an e-mail, or the like) in an emergency or the like.
(Display of Pop-Up)

Hereinafter, an example of an operation in which the application displays the above-described pop-up will be described with reference to the flowcharts of FIGS. 6 to 8.

Figure 6:
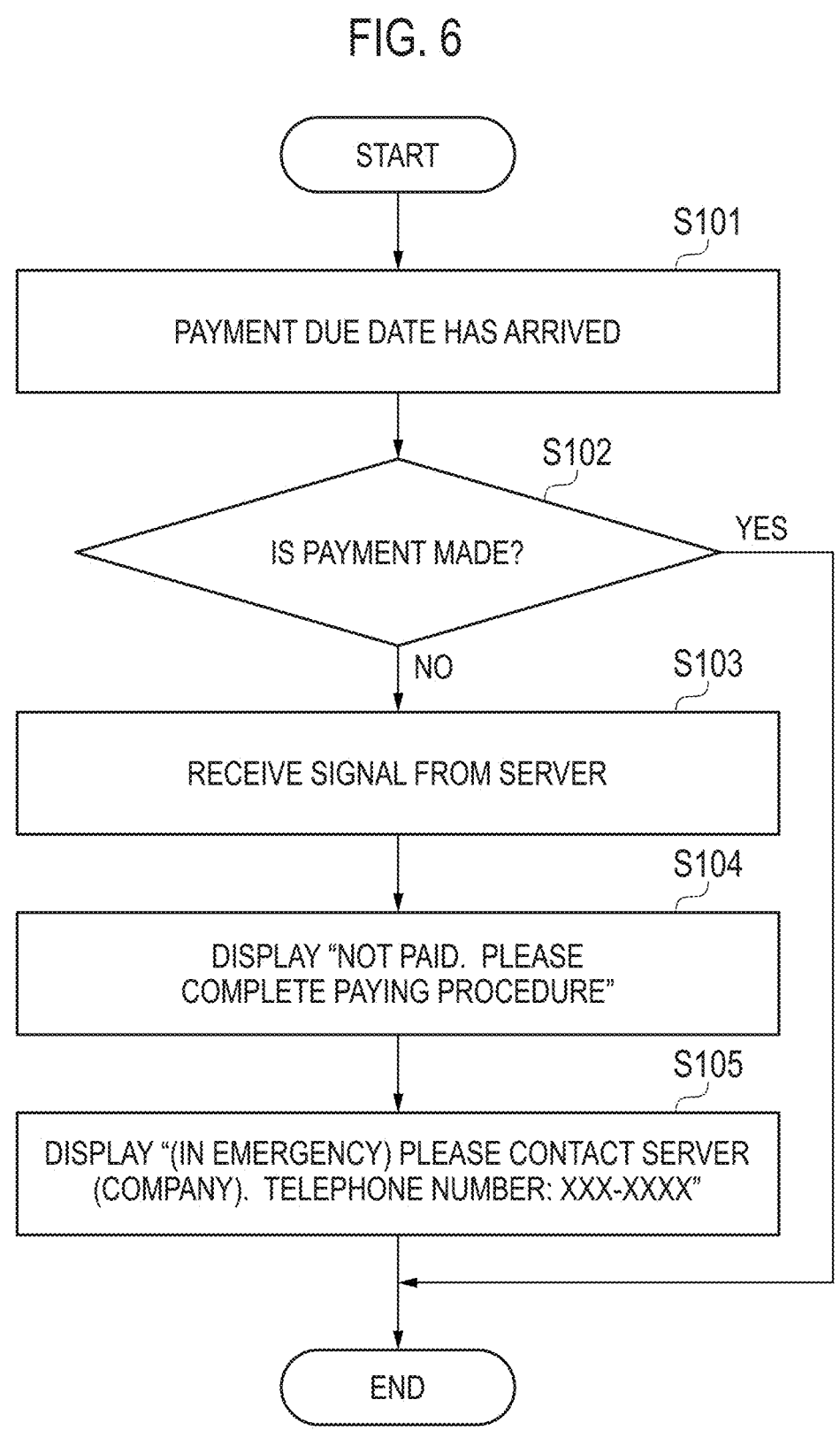
FIG. 6 is a flowchart for explaining an operation in which an application displays a pop-up.

Firstly, as illustrated in FIG. 6, when the payment due date of the car loan or the lease related to the vehicle has arrived in step S101, if such payment is not made in step S102, the operation proceeds to step S103, and if such payment is made, the operation ends.

In step S103, the application receives the signal from the server 30, and in step S104, in response to the signal, the application notifies the user of the message "Not paid. Please complete paying procedure" (pop-up display indicating that the predetermined payment that has passed the payment due date has not been made). Here, the control device 10 sets the activation of the drive device 2 to be disabled.

Thereafter, in step S105, the application may perform a pop-up display (pop-up display indicating a contact) of "(In emergency) Please contact server 30 (company). Telephone number: xxx-xxxx" (pop-up display indicating the contact). Note that the application may always display the pop-up, or may display the pop-up when the activation operation has been performed by the driver.

Figure 7:
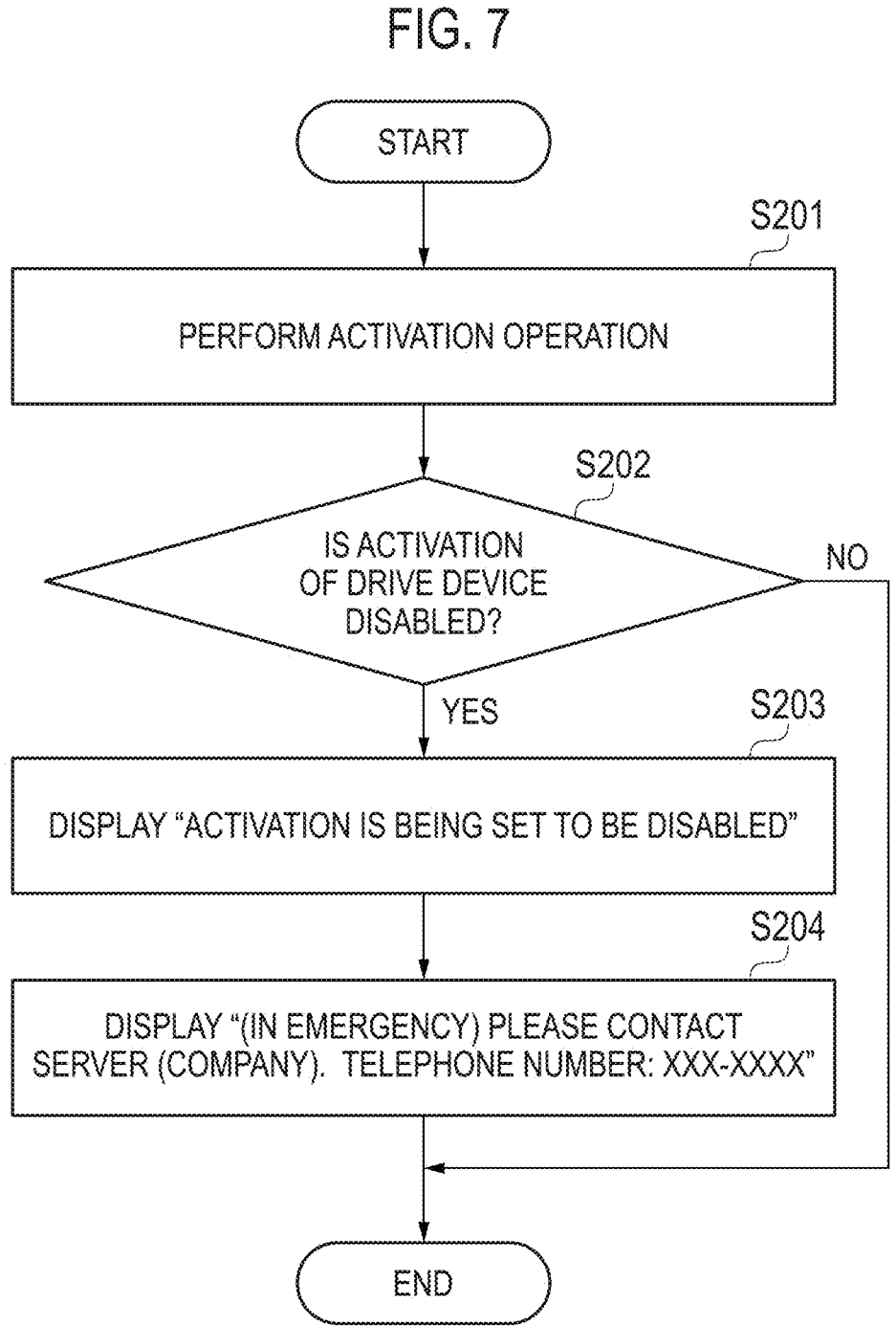
FIG. 7 is a flowchart for explaining an operation in which an application displays a pop-up.

Secondly, as illustrated in FIG. 7, if the activation operation is performed by the driver when the predetermined condition s satisfied in step S201, the application determines whether the activation of the drive device 2 is enabled or disabled in step S202. Here, the application makes such a determination on the basis of a signal from the server 30.

In a case where it is determined that the activation of the drive device 2 is enabled, the present operation ends, and in a case where it is determined that the activation of the drive device 2 is disabled, the present operation proceeds to step S203.

In step S203, the application performs a pop-up display of "Activation is being set to be disabled" (a pop-up display indicating that the activation of the drive device 2 is set to be disabled).

Thereafter, in step S204, the application may perform a pop-up display of "(In emergency) Please contact the server (company). Telephone number: xxx-xxxx". Note that the application may always display the pop-up, or may display the pop-up when the activation operation has been performed by the driver.

Figure 8:
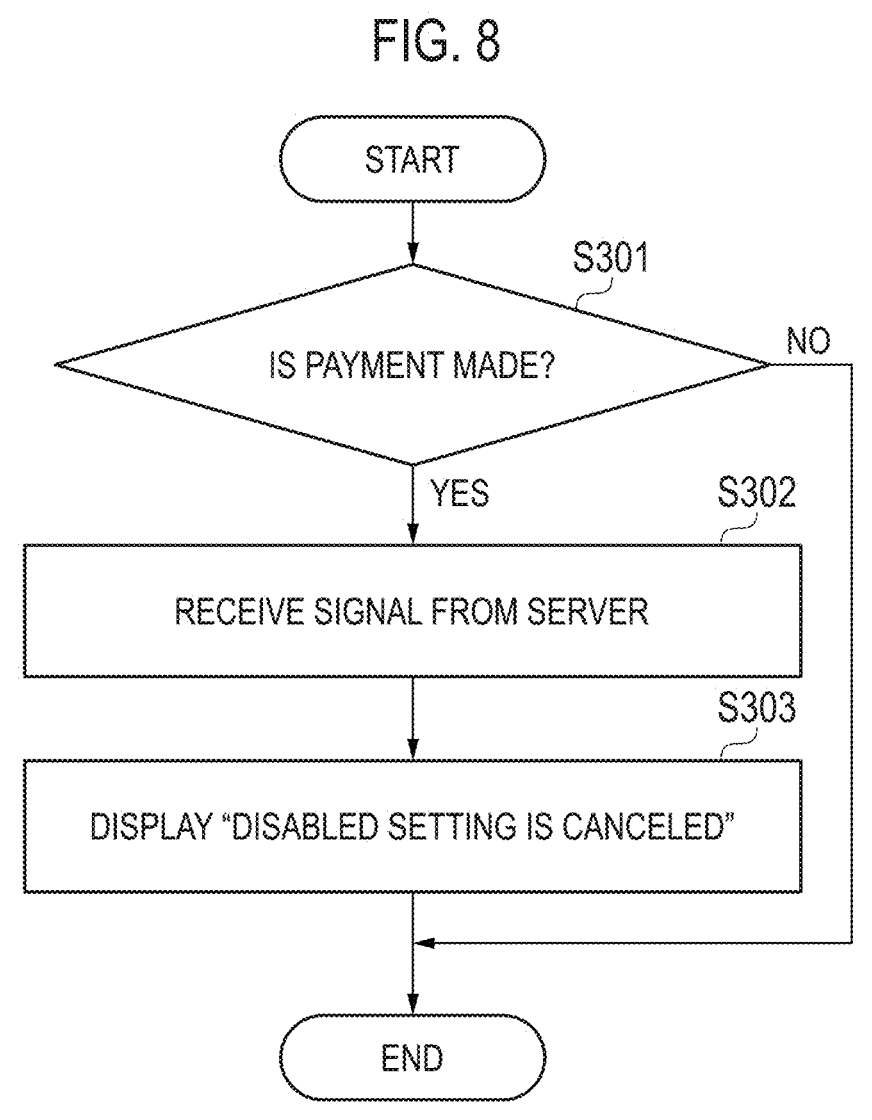

Third, as illustrated in FIG. 8, in a state where it is set that the activation of the drive device 2 is disabled because the payment has not been made when the payment due date of the car loan or the lease related to the vehicle has arrived, in step S301, in a case where the payment has been made, the operation proceeds to step S302, and in a case where the payment has not been made, the operation ends.

In step S302, the application receives a signal from the server 30, and in step S303, in response to the signal, performs a pop-up display of "Disabled setting is canceled" (a pop-up display indicating that the activation of the drive device 2 is set to be enabled). Here, the control device 10 sets the activation of the drive device 2 to be enabled.

Thereafter, in step S304, the application may perform a pop-up display of "(In emergency) Please contact the server (company). Telephone number: xxx-xxxx". Note that the application may always display the pop-up, or may display the pop-up when the activation operation has been performed by the driver.

Modification 2

Hereinafter, with reference to FIG. 9, Modification 2 of the present invention will be described focusing on differences from the first embodiment and the second embodiment described above.

Figure 9:
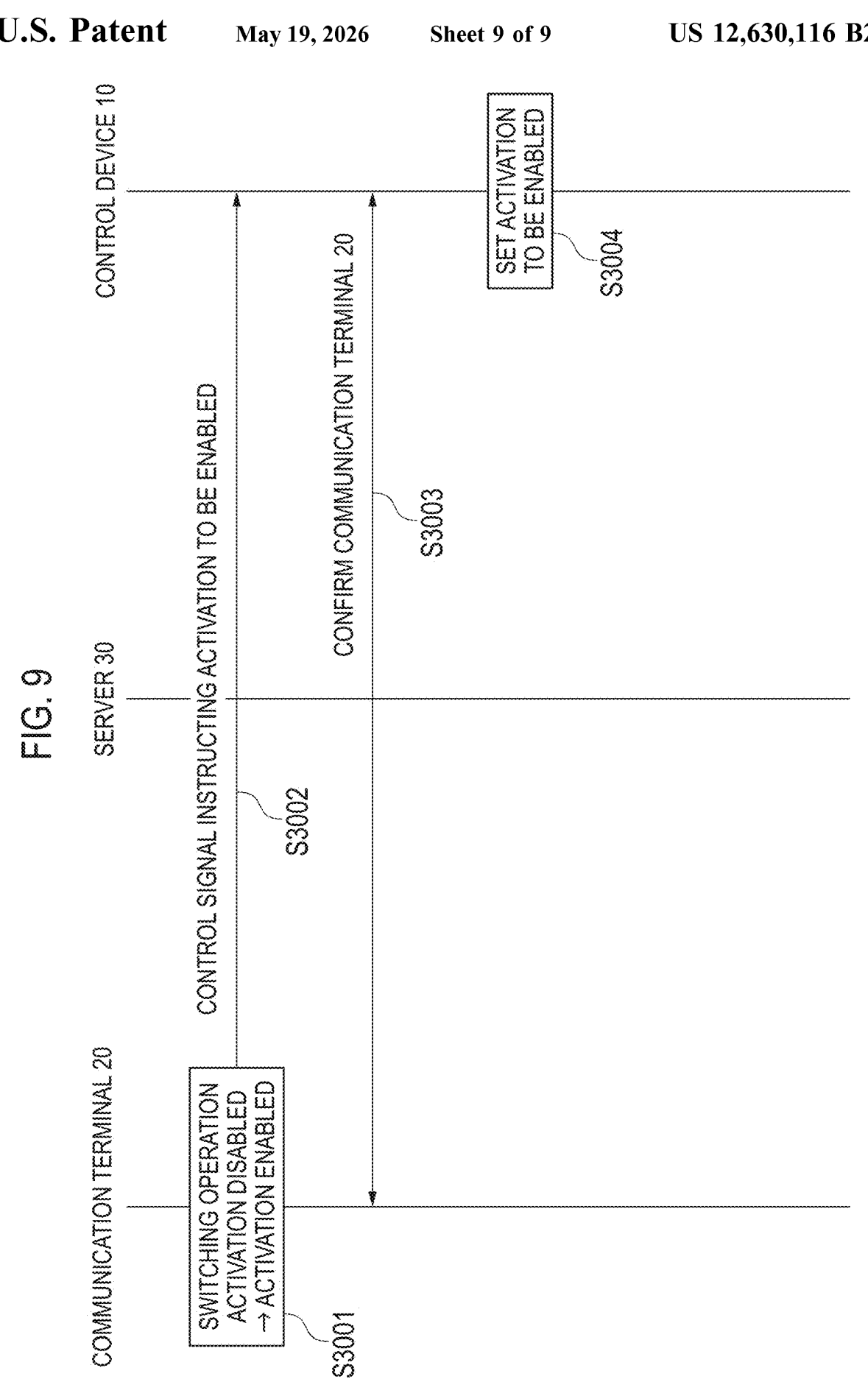
FIG. 9 is a sequence diagram illustrating an example of operation of a control system 100 according to the modification 2.

As illustrated in FIG. 9, in step S3001, when the user of the communication terminal 20 performs an operation for switching the activation of the drive device 2 from disabled to enabled, in step S3002, the communication terminal 10 transmits a signal indicating the fact to the control device 10. Such a signal may be a control signal that instructs the above-described activation.

In step S3003, the control device 10 confirms the validity of the communication terminal 20 in cooperation with the communication terminal 20. Here, the control device 10 and the communication terminal 20 may confirm the validity of the communication terminal 20 by key authentication of the communication terminal 20.

Note that in step S3003, the control device 10 may confirm the validity of the communication terminal 20 in cooperation with the server 30. In such a case, the control device 10 and the server 30 may confirm the validity of the communication terminal 20 by key authentication of the communication terminal 20.

In step S3004, when the validity is confirmed, the control device 10 sets the activation of the drive device 2 to be enabled.

Although the present invention has been described in detail using the above-described embodiments, it is apparent to those skilled in the art that the present invention is not limited to the embodiments described herein. The present invention can be implemented as modifications and variations without departing from the spirit and scope of the present invention defined by the description of the claims. Therefore, the description of the present specification is for the purpose of illustration and does not have any restrictive meaning to the present invention.

The invention claimed is:

1. An on-vehicle device mounted on a vehicle having a drive device and a control device that controls activation of the drive device, the on-vehicle device comprising:

a controller configured to set activation of the drive device to be either enabled or disabled, the drive device being able to be activated by performing an activation operation in a case where a predetermined condition is satisfied, wherein the controller is configured to be upstream of the control device to receive a first signal indicating that the predetermined condition is satisfied and a second signal indicating that the activation operation has been performed, before the first and second signals reach the control device, in a case where activation of the drive device is set to be disabled, even if the activation operation has been performed in a case where the predetermined condition is satisfied, the controller is configured to prevent transmission, to the control device that controls activation of the drive device, of at least one of the first signal indicating that the predetermined condition is satisfied or the second signal indicating that the activation operation has been performed, and the predetermined condition includes at least one of a shift lever being in a parking range, a brake being stepped on, or a distance between the vehicle and a communication terminal communicating with the vehicle being less than a predetermined distance.

2. The on-vehicle device according to claim 1, wherein the controller is configured to set, in a case where the controller detects that the distance between the communication terminal and the vehicle is the predetermined distance or more, activation of the drive device to be disabled.

3. The on-vehicle device according to claim 1, wherein the controller is configured to switch setting of whether to activate the drive device in accordance with a control signal from a server or the communication terminal.

4. The on-vehicle device according to claim 1, wherein the controller is configured to, in a case where vibration of the vehicle is detected, notify the communication terminal of the detected vibration.

5. The on-vehicle device according to claim 1, wherein the controller is configured to, in a case where the drive device is activated or doors of the vehicle are unlocked after receiving a monitoring signal from the communication terminal, notify the communication terminal of a fact.

6. The on-vehicle device according to claim 1, wherein the drive device is an engine or a motor.

7. The on-vehicle device according to claim 1, wherein the predetermined condition includes the shift lever being in the parking range.

8. The on-vehicle device according to claim 1, wherein the predetermined condition includes the brake being stepped on.

9. The on-vehicle device according to claim 1, wherein the predetermined condition includes the distance between the vehicle and the communication terminal communicating with the vehicle being less than a predetermined distance.

* * * * *